United States Patent
Brown

(10) Patent No.: US 11,997,195 B2
(45) Date of Patent: *May 28, 2024

(54) METHOD AND SYSTEM FOR KEY AGREEMENT UTILIZING PLACTIC MONOIDS

(71) Applicant: BlackBerry Limited, Waterloo (CA)

(72) Inventor: Daniel Richard L. Brown, Mississauga (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/086,798

(22) Filed: Dec. 22, 2022

(65) Prior Publication Data
US 2023/0127934 A1 Apr. 27, 2023

Related U.S. Application Data

(63) Continuation of application No. 17/175,075, filed on Feb. 12, 2021, now Pat. No. 11,569,987.

(51) Int. Cl.
| | | |
|---|---|---|
| H04L 9/08 | (2006.01) | |
| H04L 9/06 | (2006.01) | |
| G06F 7/58 | (2006.01) | |

(52) U.S. Cl.
CPC .......... *H04L 9/0841* (2013.01); *H04L 9/0643* (2013.01); *G06F 7/582* (2013.01)

(58) Field of Classification Search
CPC ... H04L 9/0643; H04L 9/0841; H04L 9/3066; G06F 7/582

(Continued)

(56) References Cited

U.S. PATENT DOCUMENTS 5,146,500 A * 9/1992 Maurer ............... G06F 7/725
 713/180
5,999,627 A * 12/1999 Lee ........................ G06F 7/723
 380/28

(Continued)

FOREIGN PATENT DOCUMENTS

CA 3080861 A1 6/2019
CN 1464678 A 12/2003

(Continued)

OTHER PUBLICATIONS

Wikipedia, "Plactic Monoid", downloaded from https://en.wikipedia.org/w/index.php?title=Plactic_monoid&oldid=978374198; Sep. 14, 2020.

(Continued)

*Primary Examiner* — Samson B Lemma
(74) *Attorney, Agent, or Firm* — Moffat & Co

(57) ABSTRACT

A method for key agreement between a first party and a second party over a public communications channel, the method including selecting, by the first party, a first value "a"; multiplying the first value "a" by a second value "b" using Knuth multiplication to create a third value "d", the third value "d" being a semistandard tableau; sending the third value "d" to the second party; receiving, from the second party, a fourth value "e", the fourth value being a second semistandard tableau comprising the second value "b" multiplied by a fifth value "c" selected by the second party; and creating a shared secret by multiplying the first value "a" with the fourth value "e" using Knuth multiplication, wherein the shared secret matches the third value "d" multiplied by the fifth value "c" using Knuth multiplication.

20 Claims, 5 Drawing Sheets

(58) Field of Classification Search
USPC .......................................................... 380/277
See application file for complete search history.

(56) References Cited

U.S. PATENT DOCUMENTS

| | | | |
|---|---|---|---|
| 10,637,656 B2 | 4/2020 | Brown | |
| 11,190,496 B2 * | 11/2021 | Masny | H04L 9/0861 |
| 11,601,407 B2 * | 3/2023 | Masny | H04L 9/0819 |
| 2001/0033656 A1 * | 10/2001 | Gligor | H04L 9/0637 |
| | | | 380/28 |
| 2002/0048364 A1 * | 4/2002 | Gligor | H04L 9/0643 |
| | | | 380/37 |
| 2012/0221858 A1 * | 8/2012 | Struik | H04L 9/0844 |
| | | | 713/171 |
| 2019/0165936 A1 * | 5/2019 | Brown | H04L 9/002 |
| 2020/0228328 A1 | 7/2020 | Brown | |
| 2022/0231843 A1 * | 7/2022 | Garcia Morchon | H04L 9/3093 |

FOREIGN PATENT DOCUMENTS

| | | |
|---|---|---|
| CN | 101374043 A | 2/2009 |
| WO | 03013052 A1 | 2/2003 |
| WO | 2012107946 A2 | 8/2012 |

OTHER PUBLICATIONS

Donald E. Knuth, "Permutations, Matrices, and Generalized Young Tableaux", Pacific Journal of Mathematics, vol. 34, No. 3, pp. 709-727, Jul. 1970.

Alain Lascoux & Marcel P. Schutzenberger, "Le monoide plaxique", Quaderni de La Ricerca Scientifica, 109, Rome: CNR, pp. 129-156, 1981.

Berenstein, Arkady et al., "Geometric Key Establishment", Canadian Mathematical Society conference, Dec. 9, 2004, pp. 1-19.

Muhammad Rabi and Alan T. Sherman, "Associative One-Way Functions: A New Paradigm for Secret-Key Agreement and Digital Signatures", published at https://citeseerx.ist.psu.edu/viewdoc/download?doi=10.1.1.118.6837&rep=rep1&type=pdf, Nov. 15, 1993.

Notice of Allowance, U.S. Appl. No. 16/836,377, dated Jan. 4, 2022.

Extended European Search Report, EP21197552.9 dated Oct. 8, 2021.

Extended European Search Report, EP18882393.4, dated Aug. 15, 2020.

Wang, Yongchuan et al., "Secret Key Sharing Scheme Based on the Theory of Algebraic Semigroups", Journal of Electronics, vol. 17, No. 3, pp. 238-241, Jul. 2000.

Official Action, U.S. Appl. No. 15/824,398, dated Jul. 30, 2019.

International Search Report and Written Opinion, PCT/CA2018/051503, dated Feb. 18, 2019.

Indian Patent Application No. 202047025538, Office Action dated Mar. 17, 2022.

Extended European Search Report, EP Application No. 22150626.4; dated Jun. 28, 2022.

Kaori Fukuda, "Box-ball systems and Robinson-Schensted-Knuth correspondence", arxiv.org, Cornell University Library, May 28, 2001, XP080049416.

Benjamin Smith, "Pre- and post-quantum Diffie-Hellman from groups, actions, and isogenies", arxiv.org, Cornell University Library, Sep. 13, 2018, XP081190752.

European Search Report, Application No. EP 22 17 6119, dated Nov. 22, 2022, pp. 1-7.

Daniel R. L. Brown, "Plactic signatures", International Association for Cryptologic Research, vol. 19700101:000000, Sep. 30, 2021, pp. 1-31.

Jens Zumbragel, "Public-Key Cryptography Based on Simple Semirings", Dissertation, University of Zurich, Jan. 1, 2008, pp. 1-109.

Notice of Allowance and Fees Due, U.S. Appl. No. 17/708,734, dated Mar. 29, 2023, pp. 1-43.

Notice of Allowance and Fees Due, U.S. Appl. No. 17/708,374, dated Mar. 29, 2023, pp. 1-43.

China National Intellectual Property Administration office action for Application No. 201880076818.8 dated Aug. 23, 2023.

Canadian Intellectual Property Office (CIPO) Official Action and Examination Search Report for Application No. 3,146,196 dated Nov. 2, 2023, 6 pages.

* cited by examiner

METHOD AND SYSTEM FOR KEY AGREEMENT UTILIZING PLACTIC MONOIDS

FIELD OF THE DISCLOSURE

The present disclosure relates to cryptography, and in particular relates to key agreement for cryptography.

BACKGROUND

In cryptography, key agreement schemes define a set of rules for how two parties may each choose a secret, and then compute a shared secret based on such choice. Key agreement schemes are sometimes referred to as key exchange or key establishment schemes.

The most famous form of key agreement is referred to as the Diffie-Hellman (DH) key agreement. Various forms of Diffie-Hellman key agreements exist, including elliptic curve forms, which are commonly used on many websites.

However, quantum computers are emerging as a potential computing platform. Quantum computers use "quantum bits" rather than binary digits utilized in traditional computers. Such quantum computers would theoretically be able to solve certain problems much more quickly than classical computers, including integer factorization, which is the strength behind the Diffie-Hellman key agreement scheme.

In particular, Peter Shor formulated Shor's quantum algorithm in 1994. This algorithm is known to attack the Diffie-Hellman key agreement if a sufficiently powerful quantum computer can be built. Utilizing such algorithm, the risk of a quantum computer discovering the secret for one or both parties in a Diffie Hellman key agreement scheme is nonzero. Therefore, counter measures to Shor's algorithm are needed.

BRIEF DESCRIPTION OF THE DRAWINGS

The present disclosure will be better understood with reference to the drawings, in which.

DETAILED DESCRIPTION OF THE DRAWINGS

Figure 1:
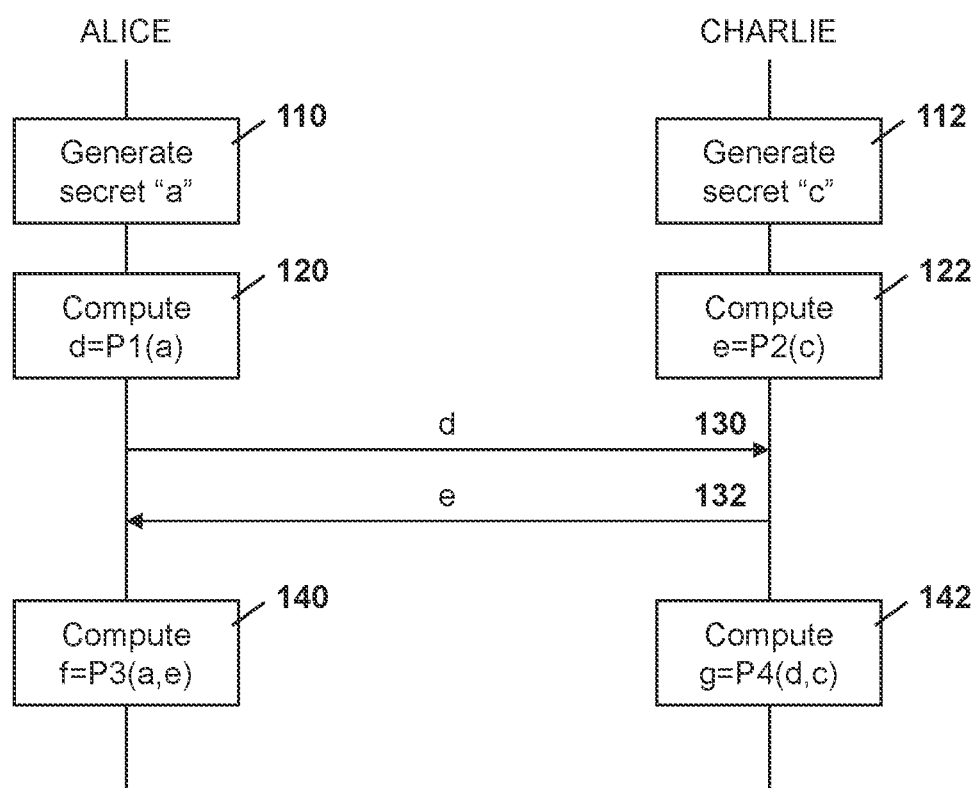
FIG. 1 is a dataflow diagram showing a key agreement scheme.

The present disclosure provides a method for key agreement between a first party and a second party over a public communications channel, the method comprising: selecting, by the first party, a first value "a"; multiplying the first value "a" by a second value "b" using Knuth multiplication to create a third value "d", the third value "d" being a semistandard tableau; sending the third value "d" to the second party; receiving, from the second party, a fourth value "e", the fourth value being a second semistandard tableau comprising the second value "b" multiplied by a fifth value "c" selected by the second party; and creating a shared secret by multiplying the first value "a" with the fourth value "e" using Knuth multiplication, wherein the shared secret matches the third value "d" multiplied by the fifth value "c" using Knuth multiplication.

The present disclosure further provides a computing device configured for key agreement between a first party and a second party over a public communications channel, the computing device comprising: a processor; and a communications subsystem, wherein the computing device is configured to: select a first value "a"; multiply the first value "a" by a second value "b" using Knuth multiplication to create a third value "d", the third value "d" being a semistandard tableau; send the third value "d" to the second party; receive, from the second party, a fourth value "e", the fourth value being a second semistandard tableau comprising the second value "b" multiplied by a fifth value "c" selected by the second party; and create a shared secret by multiplying the first value "a" with the fourth value "e" using Knuth multiplication, wherein the shared secret matches the third value "d" multiplied by the fifth value "c" using Knuth multiplication.

The present disclosure further provides a computer readable medium for storing instruction code for key agreement between a first party and a second party over a public communications channel, the instruction code, when executed by a processor of a computing device cause the computing device to: select a first value "a"; multiply the first value "a" by a second value "b" using Knuth multiplication to create a third value "d", the third value "d" being a semistandard tableau; send the third value "d" to the second party; receive, from the second party, a fourth value "e", the fourth value being a second semistandard tableau comprising the second value "b" multiplied by a fifth value "c" selected by the second party; and create a shared secret by multiplying the first value "a" with the fourth value "e" using Knuth multiplication, wherein the shared secret matches the third value "d" multiplied by the fifth value "c" using Knuth multiplication.

In accordance with the present disclosure, semigroups, which are a category of mathematical objects in algebra, may be used as a basis for key agreement schemes. In particular, in accordance with the embodiments of the present disclosure, one semigroup, namely a plactic monoid, may be used as part of a key agreement scheme.

Plactic monoids, and their use in key agreement, are described below.

Key Agreement

In key agreement schemes, two parties wish to create a secure communication utilizing a secret key, where both parties have made a contribution to such secret key.

Reference is made to FIG. 1, which shows a generalized key agreement scheme between two parties. In particular, in the embodiment of FIG. 1, two parties, namely Alice and Charlie in the embodiment of the present disclosure, are the parties that are participating in the key agreement scheme.

In the embodiment of FIG. 1, Alice generates a secret "a", as seen at block 110. Similarly, Charlie generates a secret "c", as seen at block 112.

Based on the generated secret "a" at block 110, Alice then computes a value "d" utilizing an algorithm P1 and the secret "a", as seen at block 120.

Similarly, Charlie computes a value "e" utilizing an algorithm P2 and the secret "c", as shown at block 122.

Alice then delivers the value "d" to Charlie, as shown by message 130. Similarly, Charlie delivers the value "e" in message 132 to Alice. For both messages 130 and 132, delivery is considered to be reliable and authenticated using some mechanism.

Based on the receipt of value "e", Alice may then compute a value "f" utilizing an algorithm P3, the generated secret "a" from block 110, and the received public value "e" from message 132, as seen at block 140.

Similarly, Charlie may compute a value "g" using an algorithm P4 with the secret generated at block 112, along with the value "d" received at message 130, as shown at block 142.

The computations used in the key agreement are such that f=g using algorithm P4, and therefore Alice and Charlie now share a secret, namely f=g. Such shared secret has contributions by both parties.

Such shared secret may then be used, for example, as a symmetric key for both encryption and authentication of content and messages in future communications.

The embodiment of FIG. 1 describes an asynchronous key agreement scheme, which provides a set of rules on how Alice and Charlie choose their secrets "a" and "c", and how they can compute the values d, e, f, g. Such schemes are sometimes called key exchange, to reflect the fact that public values d and e are exchanged. Similarly, they are sometimes called key distribution or key establishment. However, in accordance with the present disclosure, the term key agreement is typically used below to describe the fact that both parties contribute to the shared secret.

While the embodiment of FIG. 1 above describes a key agreement scheme in which the keys of one party are not dependent on the other, in other cases, communications may need to be synchronized and ordered. For example, if the embodiment of FIG. 1 was modified to make Charlie's public value "e" depend on Alice's public value "d", then Charlie would not be able to send "e" until "d" had been received. In this case, the model may not be considered to be asynchronous.

However, in the embodiments described below, all key agreement schemes are asynchronous. One example of such asynchronous scheme may be the Internet Engineering Task Force (IETF) protocol Transport Layer Security (TLS), which protects the HyperText Transport Protocol Secure (HTTPS) connections between clients and servers. The TLS protocol has two phases, namely a handshake and a record layer. The handshake is done first and uses public key cryptography in the form of a key agreement, and other aspects such as digital signatures for authentication.

For example, Diffie and Hellman first introduced a key agreement scheme. Alice delivers $d=b^a$ mod p to Charlie. and Charlie delivers $e=b^c$ mod p to Alice. Alice computes the agreed key as $e^a$ mod p. Charlie computes the agreed key as $d^c$ mod p. (Usually: p is a large prime, b is a fixed number, a and c are secret random numbers.) The agreed keys are equal because $e^a=(b^c)^a=b^{(ca)}=b^{(ac)}=(b^a)^c=d^c$, working modulo p throughout.

The agreed secret key can then be used to secure messages (by encrypting and authenticating).

Elliptic curve Diffie-Hellman key agreement is a variant of the original Diffie-Hellman key agreement, except that it replaces exponentiation modulo a large prime, by scalar multiplication over an elliptic curve. Despite the extra complication, ECDH is faster and smaller than DH, because the best attacks against ECDH are slower than attacks against DH. The slower attacks on ECDH allows keys in ECDH to be smaller and faster.

A quite different type of key agreement, Supersingular Isogeny-based Diffie-Hellman (SIDH), uses an even more complicated type of mathematics. Isogenies are special maps between elliptic curves. No practical attacks on SIDH have yet been published, even given quantum computers. A variant of SIDH key agreement (called SIKE) is under consideration as a Round 3 alternative in the NIST post-quantum cryptography project.

The TLS handshake has an elliptic curve Diffie-Hellman (ECDH) key agreement as an option, and TLS 1.3 requires some form of Diffie-Hellman key agreement, which may be either EDCH or classic DH.

The DH parts of a TLS handshake are asynchronous. For example, a server Alice and client Charlie use the handshake to agree on a master key. The master key is in used to derive session keys which are used in the TLS record layer to protect subsequent content data such as downloaded and uploaded webpages and similar web traffic.

Semigroups

Semigroups are a category of mathematical objects in algebra. Each semigroup S has a set of elements, and a binary operation defined on the set. The binary operation must be associative. This means that:

$$a(bc)=(ab)c \qquad (1)$$

In equation 1 above, a, b and c are in the semigroup S. Equation 1 indicates that when computing the product abc of three elements a, b and c, it does not matter if one multiplies a and b first, getting some value d=ab, and then multiplying d by c to get abc=dc, or if one first multiplies b and c to get a value e=bc and then multiplying a and e to get abc=ae.

Any set equipped with an associative binary operation is a semigroup.

When discussing a general semigroup S, it is often assumed that the operation is written as multiplication. Furthermore, when a and b are variables represented with values in S, the product is written as ab, omitting any multiplication sign. However, in particular specific semigroups, such as positive integers under addition, a symbol "+" for a binary operation is used and the operation may be written as a+b instead of ab.

Associativity means that in the product abc, the order in which the two multiplications are carried out does not matter. Thus, either ab or bc could be computed first, but the final result is the same.

In accordance with the present disclosure, semigroups have a multiplication operator.

Semigroups are however not required to have a division operator. In some cases, a division operator may be formed, and is written as "/". A division operator is a binary operator having left and right input. If / is a binary operator on semigroup S, / may be defined as a strong divider if:

$$(ab)/b=a \qquad (2)$$

Where equation 2 above is valid for all a,b in S.

The operator / may be defined as a partial strong divider if equation 2 above only holds for a subset of a,b values within S.

In semigroup nomenclature, the operation is generally written as ab/b instead of (ab)/b, which means that multiplications are done before divisions.

Further, a weak divider may also be defined for a semigroup. In particular, sometimes a semigroup has multiplication in which ab=db for many different values of d. In this case, there cannot be a strong divider. A "/" is a weak divider if:

$$(ab/b)b=ab \qquad (3)$$

In equation 3, the weak divider is defined for all a, b and S.

A partial weak divider utilizes equation 3, but is only valid for a subset of values a, b within S.

In equations 2 and 3 above, the divider / is also called a right divider. Similarly, a binary operation "\" is called a left divider. The operator \ is a strong left divider if b\ba=a. Further, the binary operator \ is a weak left divider if b(b\ba)=ba.

In various semigroups, a divider operation may be known. For example, for positive integers under multiplication, it is the usual Euclidean division algorithm. For positive integers under addition, the division may become subtraction. Dividers are known for some matrix subgroups, where Bareiss elimination can be used.

Converting A Semigroup into a Key Agreement Scheme

Any semigroup may be converted into a key agreement scheme. Indeed, such construction allows for every key agreement scheme to be constructed in this way, including existing schemes such as DH key agreements and SIDH key agreements.

Based on the above, if a secure, post quantum resistant key agreement scheme is possible, it can be created utilizing the methods and systems in accordance with the present disclosure, along with some subgroup.

Figure 2:
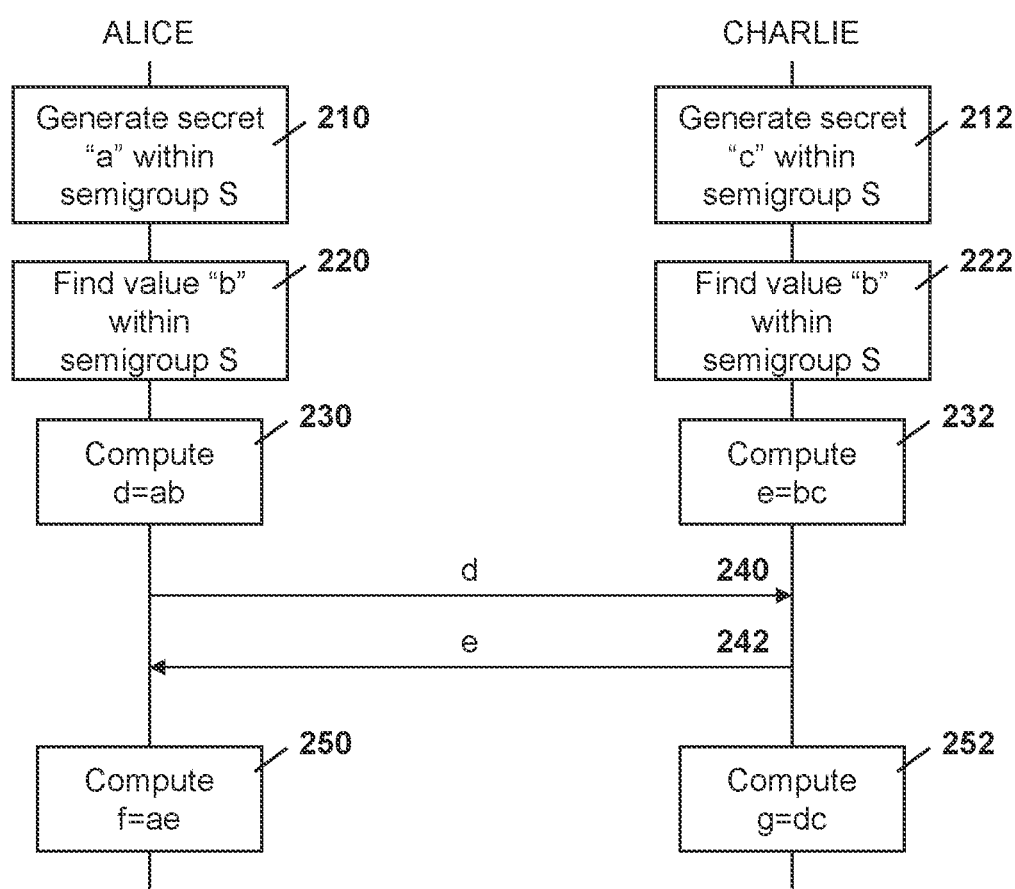
FIG. 2 is dataflow diagram showing a key agreement scheme utilizing semigroups.

Reference is now made to FIG. 2. In the embodiment of FIG. 2, two parties wish to create a secret key through a key agreement scheme. In particular, as with FIG. 1, Alice and Charlie communicate with each other.

In accordance with the embodiment of FIG. 2, S is a semigroup. Alice, at block 210, chooses a secret code "a" within the semigroup S.

Similarly, at block 212, Charlie chooses a secret "c" found within the semigroup S.

Further, as seen at block 220 and 222, both Alice and Charlie choose a value "b" found within the semigroup S. The value b can be a public fixed value, or a prearranged secret value such as something derived from a password shared between Alice and Charlie. Other options for determining b are possible. Based on this, the value "b" can be a public value or can be a weak shared secret in some cases.

At block 230 Alice computes a value d=ab. Similarly, at block 232, Charlie computes a value "e" where e=bc.

Thereafter, as seen by message 240, Alice delivers the value "d" to Charlie. Similarly, in message 242, Charlie delivers the value "e" to Alice.

At block 250, Alice computes f=ae. At block 252, Charlie computes g=dc.

Since S is a semigroup, multiplication is associative. Therefore, f=ae=a(bc)=(ab)c=dc=g.

Based on this, both Alice and Charlie compute the same value f=g.

In the embodiment of FIG. 1, the variables a, c, d, e, f and g were used. These variables are similarly used in FIG. 2 to illustrate that the construction is a key agreement scheme.

Comparing the embodiments of FIG. 1 and FIG. 2, the embodiment of FIG. 2 uses the semigroup S. Further, it uses an extra variable b, which is a shared or pre-shared element of S.

In the embodiment of FIG. 2, the value that is shared over the public channel is computed through multiplication. In FIG. 1, it was not specified how the values of d and e were computed from a and c respectively.

Further, the embodiment of FIG. 2 uses semigroup multiplication to compute the shared secret f=g. The embodiment of FIG. 1 did not specify how the shared secrets were computed.

Further, the associativity of the semigroup is used to ensure that f=g. Conversely, in FIG. 1, the algorithm used to compute f and g were not defined to allow that Alice and Charlie could ensure that they agree on the same shared secret.

Using the embodiment of FIG. 2 above, any key agreement scheme can be created. However, the semigroup chosen determines the security of the key agreement scheme.

For example, various paraments of the semigroup may indicate a lack of security. In particular, a semigroup S that is used for key agreement must not have an efficient divider operator. If it did, then an adversary could compute Alice's secret a as a=d/b when b is public or if b is a weak secret such as a password. Once the attacker figures out the secret a, the attacker can copy Alice's computations at block 250 to obtain the shared secret f=ae.

Similarly, no efficient left divider should exist within the semigroup S to avoid security issues.

Other elements to be considered when choosing the secure semigroup S are provided below.

The Plactic Monoid

One semigroup that may be used for the embodiments of the present disclosure is a plactic monoid. A monoid is any semigroup with identity element. When clear from context, the identity element is written as 1. Being an identity element means 1 a=a=a1 for all a in the monoid.

Figure 3A:
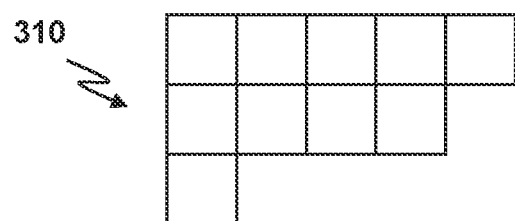
FIG. 3A is a block diagram showing a Young diagram in English notation.
Figure 3B:
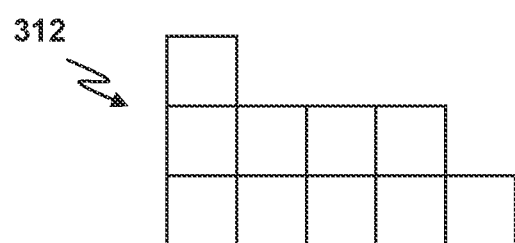
FIG. 3B is a block diagram showing a Young diagram in French notation.

A tableau consists of rows of symbols, sorted by length. For example, Alfred Young in 1900 defined a set of boxes or cells arranged in a left-justified form, now known as a Young diagram. FIG. 3A shows a Young diagram 310 in which the cells are sorted by length from the top down, with the top being the longest. This is referred to as English notation. FIG. 3B shows a Young diagram 312 sorted by length with the bottom being the longest. This is referred to a French notation. The embodiments of the present disclosure could use either notation, but French notation is used as an example in the present disclosure.

A Young tableau comprises filling the boxes in the Young diagram with symbols from some ordered set. If the ordered set has no duplicates, this is referred to as a standard tableau. If the symbols in the ordered set are allowed to repeat, this may create a semistandard tableau. Specifically, in a semistandard tableau, each is row is sorted from lowest to highest (left to right), with repeats allowed. Also, in a semistandard tableau, each is column is sorted, but with no repeats allowed. In French notation, the columns are sorted lowest-to-highest (bottom-to-up).

An example of a semistandard tableau with single-digit symbols is shown with regards to Table 1 below.

TABLE 1

| Example semistandard tableau with single-digit symbols |
|---|
| 7 |
| 669 |
| 5556689 |
| 444456666 |
| 3333355556 |
| 222222344444 |
| 1111111111111133 |

Knuth (1970) defined an associative binary operation applicable to semistandard Young tableaus via algorithms of Robinson (1938) and Schensted (1961). Schutzenberger and Lascoux (1980) studied the resulting algebra, naming it the plactic monoid.

Multiplication can occur on a symbol by symbol basis. An example is shown in Table 2 below, which shows the creation of a plastic monoid based on the string 'helloworld' using a single-symbol tableau. In Table 2, each row must be sorted. In this case, when the next symbol can be added to the end of bottom row and leave the row sorted, it is added to this row. When the symbol cannot be added to the end of the bottom row, it replaces the symbol in that row which would leave the row sorted, and the replaced symbol is added to the row above in a similar fashion. If there is no row above a symbol, then a new row is created.

TABLE 2

Example Knuth multiplication

| Symbol | Tableau | Notes |
|---|---|---|
| h | h | Since no row existed, h, forms the first row |
| e | h<br>e | Since 'e' is before 'h', it replaces this symbol and the 'h' is moved to the row above |
| l | h<br>el | 'l' can be added to the end of the last row |
| l | h<br>ell | 'l' can be added to the end of the last row |
| o | h<br>ello | 'o' can be added to the end of the last row |
| w | h<br>ellow | 'w' can be added to the end of the last row |
| o | hw<br>elloo | "o" cannot be added to the end of the last row, so it replaces the 'w', and the 'w' moves up to the next row. |
| r | hw<br>elloor | 'r' can be added to the end of the last row |
| l | w<br>ho<br>elllor | 'l' replaces the 'o' in the bottom row.<br>'o' replaces 'w' in the second row.<br>'w' moves up and creates a new row. |
| d | w<br>h<br>eo<br>dlllor | 'd' replaces the 'e' in the first row. 'e' replaces the 'h' in the second row. 'h' replaces the 'w' in the third row. 'w' moves up and creates a new row. |

As seen from Table 2, multiplication is achieved through repeated insertion of symbols in a semistandard tableau.

In some embodiments, a string equivalence may be created from the tableau of Table 2. Specifically, instead of considering the plastic monoid as the set of semistandard tableaus, the set of all string forms may be considered up to equivalence relation. Two strings are equivalent if they generate the same semistandard tableaus. In this form, each tableau has alternate representation as strings, From the last row of Table 2 for the "helloworld" string, the row reading string is "wheodllor" and the column reading string is "whedolllor". These two strings, and several others, will generate the same tableau as "helloworld" generates.

The "helloworld" and "wheodlllor" strings are equivalent because they both generate the same tableau. Thus they are both alternative representations of the same semistandard tableau.

A simplified example of a C program to implement such multiplication is shown with regards to Table 3 below.

TABLE 3

Example C program for Knuth multiplication

```
#include <stdio.h>
#define T(a,b)(aˆ=b,bˆ=a,aˆ=b,1)
enum{L=1000000};typedef char*s,S[L];typedef int i;typedef void _;
i knuth(i i,s
```

TABLE 3-continued

Example C program for Knuth multiplication

```
w){return(w[2]<w[i-1])&(w[0]<=w[i])&&T(w[1],w[(i+1)%3]);}
_ robinson(s w,i j){i i; for(;j>=2&&w[j]<w[j-1];j--)
for(i=1 ;i<=2;i++) for(;j>=2&&knuth(i,w+j-2);j--) ; }
_ get(s w){i i=0,c; while(i<L && (c=getchar( ))!=EOF)
if(0!=c && '\n'!=c) w[i]=c, robinson(w,i++);}
_ put(s w){char o=0; for(;*w;w++) o>*w?puts(""):0, putchar(*w),
o=*w;}
i main(_){S w={ };get(w);put(w);puts("");}
```

In the example code in Table 3, the program input is any text, with each ASCII character except nulls and newlines representing a generator element of the plastic monoid. The output of the program is a product of these, according to Knuth's version of the Robinson-Schensted algorithm, represented as a semistandard tableau, as shown for example in Table 2.

While the examples of Tables 2 and 3 use ASCII characters as the ordered set for single-symbol tableaus, in practice any ordered set may be used as long as it is agreed to by both parties in a key agreement situation, as described below. Further, while single-symbol tableaus are provided in the examples, in practice multi-symbol tableaus could equally be used.

Each element of the plastic monoid is therefore a product of symbols (also called generators). Products of symbols are considered equivalent if they can be related by a sequence of Knuth transformations as described above.

Elements of the plastic monoid are therefore equivalence classes of such products of symbols.

Key Agreement using Plastic Monoids

As a plastic monoid is a semigroup, it can be used for key agreement, referred to herein as plastic key agreement. Further, as the plastic monoid does not seem closely related to the DH, ECDH or SIDH, the security of plastic key agreement is independent of security these key agreement schemes. Plastic key agreement is therefore resistant to known quantum attacks.

Figure 4:
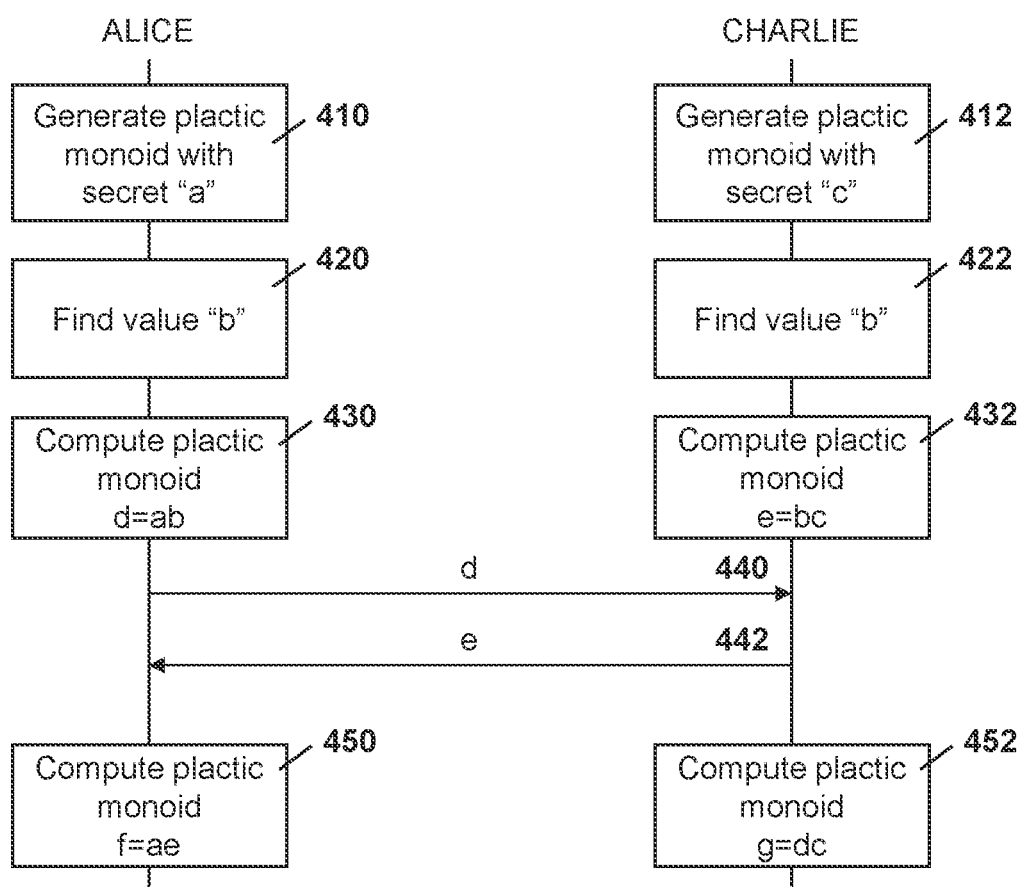
FIG. 4 is dataflow diagram showing a key agreement scheme utilizing plactic key agreement.

Reference is now made to FIG. 4. In the embodiment of FIG. 4, two parties wish to create a secret key through a plastic key agreement scheme. In particular, as with FIG. 1, Alice and Charlie communicate with each other.

In accordance with the embodiment of FIG. 4, Alice, at block 210, chooses a secret code "a" and generates a semistandard tableau. In some embodiments the semistandard tableau can however be created during a multiplication and thus, in some cases Alice may simply choose secret "a". Specifically, converting "a" to a semistandard tableau can occur either before multiplication with "b", as described below, or the two strings can be concatenated as "ab" and converted to a semistandard tableau.

Similarly, at block 212, Charlie chooses a secret "c" and may further in some cases create a semistandard tableau using Knuth multiplication as described in Table 2 above.

In some cases, the generation of 'a' and 'c' may be done with a strong entropy source combined with a strong pseudorandom number generator. For example, uniform selection of rows of symbols may not the best for security. Specifically, the content of the row, meaning the sorted version of the row's symbols, is generally revealed during key agreement, and is not kept secret. For another example, further security might reveal that some keys are weak, and that these arise often enough to warrant checking for weak keys, and the keys may be re-generated as necessary.

As seen at block 420 and 422, both Alice and Charlie find a value "b". The value b can be a public fixed value, or a prearranged secret value such as something derived from a password shared between Alice and Charlie. Other options for determining b are possible. Based on this, the value "b" can be a public value or can be a weak shared secret in some cases. In some cases "b" can be in the form of a semistandard tableau.

At block 430 Alice computes a value d=ab using Knuth multiplication to find a semistandard tableau. For example, to multiply semistandard tableaus a and b, insert the symbols of b into a successively. As described with regard to Table 2, to insert a symbol, append it to the bottom row if possible (meaning that one still has a semistandard tableau). If not possible, let the inserted symbol replace one symbol of the bottom row. The replaced symbol then gets inserted into the rows above.

Similarly, at block 432, Charlie computes a value "e" where e=bc using Knuth multiplication to find a semistandard tableau.

Thereafter, as seen by message 440, Alice delivers the value "d" to Charlie. Similarly, in message 442, Charlie delivers the value "e" to Alice.

As will be appreciated by those in the art, the values "d" and "e" are sent in the clear, so tableau form is necessary for security. If Alice had simply computed d=ab as a concatenation of strings, without applying the tableau form, this raw string a would still be a valid alternative representation of d, but she would leak a, since an attack could find a just be reading from the start of the string. Putting d in tableau form helps to hide a. The exact ordering of the symbols in "a" get mixed by the tableau computation. So, tableau form is used in d and e, else Alice and Charlie's secrets a and c will leak.

At block 450, Alice computes f=ae using Knuth multiplication to find a semistandard tableau. At block 452, Charlie computes g=dc using Knuth multiplication to find a semistandard tableau.

The use of a semistandard tableau created by Knuth multiplication is used for f and g, because the tableau forms used in d and e have scrambled the symbol orderings, so the only way to get agreement is to use a standard form, in this case, the semistandard tableau form.

As f=abc=g, Alice and Charlie now share a secret, namely f=g. Such shared secret has contributions by both parties. Such shared secret may then be used, for example, as a symmetric key for both encryption and authentication of content and messages in future communications.

An example simplified bash shell script for implementing the embodiment of FIG. 4 is shown below with regards to Table 4. In the example in Table 4, the keys are small for illustration purposes, and are therefore likely insecure.

TABLE 4

Example Script Demonstrating Plactic Key Agreement

```
rand ( ) { head -c $1 /dev/urandom | base64 ; }
rand 48 > a # Alice generates individual secret
rand 48 > b # Base common to Alice and Charlie
rand 48 > c # Charlie generates individual secret
cat a b | ./mult > d # Alice delivers to Charlie
cat b c | ./mult > e # Charlie delivers to Alice
cat a e | ./mult > f # Alice computes agreed secret
cat d c | ./mult > g # Charlie computes agreed secret
sha256sum f g # Derive hashed keys, etc.
```

While the script shown is implemented on one machine, in practice parts of the script would be performed on two machines and delivered between the machines as provided in the embodiment of FIG. 4.

In one example of running the script, 'a' is chosen as: BHmHU05KZJWcEUvGuJ37skC3+wDn7IRi6Gi/ZBhZg-4sZGzVxQruaQ6lvJ1d2y2 xe. Also, 'b' is chosen as: 2imJOKAzptzOLfjKzCZtSmY94TT6AckfThaIOh4TQa0-ghD4R3SuRtvgYLbT5pmz f and 'c' is chosen as: Fwhh-27JmGwabMe3TMa6B9WDV3YJ/uTRmKrvcyLkZV1f-4ZiF7Tcpd4WFdOBA 3hw81.

Using these values, 'd' is calculated as 'ab' and is shown in Table 5 below:

TABLE 5

Example Calculation for 'd' v
u
s
m
k
i
Zwz
Wns
Uhr
KUIx
HRcgu
EHZaly
CGQZipv
BBOVYdmxz
7AJQTcijmtuz
57DGJLOZeklttz
3669CGJSSZaaffhh
013446ADJKOTTYgghp
+/02223445KLQRRTTbfmvz Similarly, 'e' can be calculated from 'bc'.

Alice receives 'e' and Charlie receives 'd'. Alice calculates 'f' as 'ae', which is 'abc'. Similarly, Charlie calculates 'g' as 'dc', which is 'abc'. An example of T is shown in Table 6 below.

TABLE 6

Example Calculation for 'f' v
u
s
mw
ks
irz
hnx
Zlp
Wciy
Uagu
RUdlv
KQZcu
HOVZmx
EHTYhimt
CGLWZgjpz
BDJQSehktz
ABCJKYZflvz
779GGSTbffmt
566DFJOaaabmuz
345ABDJOQRTVYegww
133679BGJKLTVacfhhkr
002244446AJKMMRRTZhimpvy
+//1122333478FFLOTTTWZcddhw When 'f' and 'g' are put through a hash such as a SHA256 hash, both result to: b6f082f051ade15684ac10bdc69-6f7e84dfd9ad5a20ddd5eefb2a0f24d0837d2, indicating key agreement.

The embodiments of FIG. 4 and Table 4 perform key agreement without any authentication being explicitly described. However, all key agreement, including well-established ECDH key agreement, is vulnerable to a man-in-the-middle attack, if the attacker can replace the delivered values with his own. Therefore, most security protocols based on (ECDH) key agreement apply some authentication, often a digital signature, to one or both delivered values. Similar authentication may occur with plactic key agreement to avoid man-in-the-middle attacks.

Further, the embodiments of FIG. 4 and Table 4 perform key agreement using lines of text. However, in some cases, different operating systems use different conventions for line termination. Different languages and different systems have used different rules for sorting characters, and different sets of characters.

A larger set of symbols may also in some cases be beneficial for security purposes. Specifically, the example of Table 4 limits the set of symbols to 253, by excluding the NULL character and typical new line characters. Accordingly, a different input and output format might be used in some embodiments. For example, symbols might be 32-bit integers, and elements might consist of a fixed length of symbols, say 1000. Using this example, Alice and Charlie would send each other 4000 bytes. Other examples are possible, and the present disclosure is not limited to any character set or set of symbols.

Based on the above, the key agreement may, in some cases, need to agree on the set of symbols and ordering of the set prior to key agreement.

Compression

In some embodiments, the shared elements (ab and bc) during key agreement may be compressed, as the elements may be lines of text.

Compression and decompression involve no secrets, so they can be applied independently of the actual cryptographic implementation, and essentially independent of the security.

In this regard, compression and decompression may be applied in some embodiments in order reduce the size of the payload when communicating between Alice and Charlie.

Optimization

In some embodiments, other optimizations may be implemented during key agreement. For example, in one case code could be made resistant to buffer overflows.

For example, inputs may be checked and be properly validated. For example, if inputs are too long, then outputs will be incorrect, likely non-interoperable, and may be insecure. This could lead to a buffer overflow.

Various other secure programming techniques may also be implemented in some embodiments when implementing plactic key agreement in the real world. For an example, a real-world implementation could zeroize secrets immediately after use, so that the secrets do not reside in memory or get written to a disk.

Side channel resistance may also be implemented in some embodiments. In key agreement, some inputs are secret. An attacker learning the run-times might be thereby learn something about the secret inputs which affect the run-times. Ideally, implementations should avoid such attacks by running in constant-time, or at least with run-time not correlated to secrets.

For conditional swaps in particular, there is a well-known general constant-time conditional swaps, which is used in elliptic curve cryptography. The use of constant-time conditional swaps could therefore be implemented in plactic key agreement in some embodiments.

Further, in some cases optimization may be performed on the code for plactic key agreement to improve the performance of the code. For example, the code in Table 4 repeatedly swaps pairs of elements in an array. A possible optimization might avoid this by placing rows non-contiguously in memory. This would allow rows to grow or shrink without needing to shift the rows in some cases.

On the other hand, a full two-dimensional array to store a tableau might use too much memory. Less memory can be used by instead storing rows using dynamic memory, known as the heap.

Further, if dynamic memory is too risky for some reason, such as side channel attacks, then a more special data structure can be used. In this case, a hyperbola can be drawn through the grid marking the only locations where the symbols can occupy a position. Approximately $n \log(n)$ memory locations will be needed.

Other options for optimization are also possible.

Combination of Plactic Key Agreement with Other Key Agreement Schemes

In some embodiments, plactic key agreement may be the only mechanism used for key agreement. In other embodiments, plactic key agreement may be used in conjunction with other key agreement mechanisms. As different key agreement schemes may not suffer from the same attacks, the combination of key agreement schemes could provide an extra layer of protection.

Using the embodiment of FIGS. 2 and 4, Alice may generate two secrets, namely a and a', and Charlie may also generate two secrets, namely c and c'. A common value b, or two values, namely b and b' could then be used, where Alice could generate ab using a first key agreement mechanism, such as ECDH, and generate a'b' (or a'b) using plactic key agreement, and provide these Charlie.

Similarly, Charlie could generate bc using a first key agreement mechanism, such as ECDH, and generate b'c' (or bc') using plactic key agreement, and provide these Charlie.

Alice and Charlie could then generate f and g using ECDH mechanisms and f' and g' using plactic key agreement mechanisms. The values f and f' could be hashed in some embodiments to create a key that would correspond to a hash of g and g'.

Based on the above, plactic key agreement could be used, either alone, or in combination with other key agreement mechanisms. Plactic key agreement has no known quantum vulnerabilities and could therefore be used to provide additional security to communications.

The above methods may be implemented using any computing device. One simplified diagram of a computing device is shown with regard to FIG. 5. The computing device of FIG. 5 could be any fixed or mobile computing device.

Figure 5:
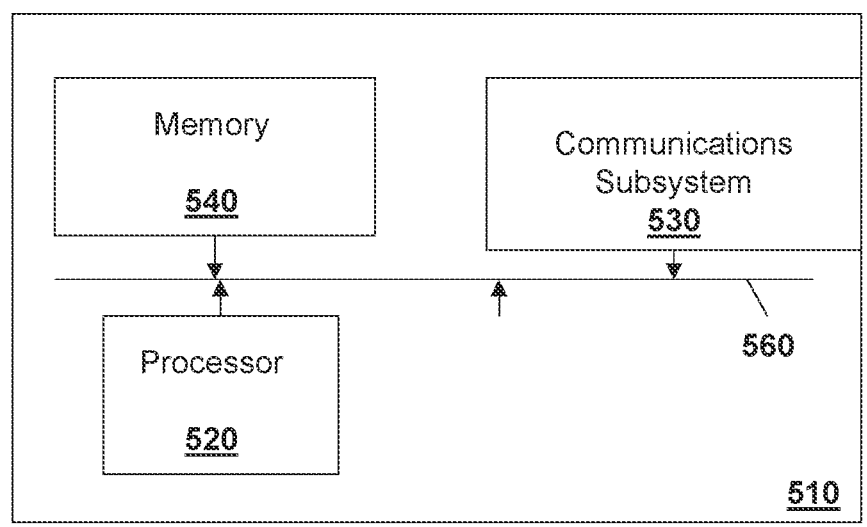
FIG. 5 is a block diagram of a simplified computing device capable of being used with the embodiments of the present disclosure.

In FIG. 5, device 510 includes a processor 520 and a communications subsystem 530, where the processor 520 and communications subsystem 530 cooperate to perform the methods of the embodiments described above. Communications subsystem 530 may, in some embodiments, comprise multiple subsystems, for example for different radio technologies.

Processor 520 is configured to execute programmable logic, which may be stored, along with data, on device 510, and shown in the example of FIG. 5 as memory 540. Memory 540 can be any tangible, non-transitory computer readable storage medium which stores instruction code that, when executed by processor 520 cause device 510 to perform the methods of the present disclosure. The computer readable storage medium may be a tangible or in transitory/ non-transitory medium such as optical (e.g., CD, DVD, etc.), magnetic (e.g., tape), flash drive, hard drive, or other memory known in the art.

Alternatively, or in addition to memory 540, device 510 may access data or programmable logic from an external storage medium, for example through communications subsystem 530.

Communications subsystem 530 allows device 510 to communicate with other devices or network elements and may vary based on the type of communication being performed. Further, communications subsystem 530 may comprise a plurality of communications technologies, including any wired or wireless communications technology.

Communications between the various elements of device 510 may be through an internal bus 560 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A computer implemented method for key agreement between a first party and a second party over a public communications channel, the method implemented using at least one hardware processor and comprising:
    selecting, by the first party, a first value "a";
    concatenating the first value "a" with a second value "b" to create a value "ab";
    creating a semistandard tableau for a third value "d" by applying Knuth multiplication to value "ab";
    sending the third value "d" to the second party;
    receiving, from the second party, a fourth value "e", the fourth value being a second semistandard tableau comprising the second value "b" combined with a fifth value "c" selected by the second party; and
    creating a shared secret by multiplying the first value "a" with the fourth value "e" using Knuth multiplication, wherein the shared secret matches the third value "d" multiplied by the fifth value "c" using Knuth multiplication.

2. The method of claim 1, wherein the first value "a" is generated from an ordered set of symbols agreed to between the first party and the second party.

3. The method of claim 2, wherein the first value "a" is generated using a strong entropy source combined with a strong pseudorandom number generator.

4. The method of claim 1, wherein the sending of the third value utilizes an authentication mechanism.

5. The method of claim 1, where the sending of the third value uses data compression.

6. The method of claim 1, further comprising:
performing a second key agreement between the first party and the second party, the second key agreement being a key agreement other than a plactic key agreement; and
hashing the shared secret with a second shared secret found using the second key agreement.

7. The method of claim 6, wherein the second key agreement is any one of Diffie Hellman key agreement; Elliptic Curve Diffie Hellman key agreement; and
Supersingular Isogeny-based Diffie-Hellman (SIDH) key agreement.

8. The method of claim 1, further comprising using multi-symbol tableaus to create the semistandard tableau.

9. A computing device configured for key agreement between a first party and a second party over a public communications channel, the computing device comprising:
a processor; and
a communications subsystem,
wherein the computing device is configured to:
select a first value "a";
concatenate the first value "a" with a second value "b" to create a value "ab";
create a semistandard tableau for a third value "d" by applying Knuth multiplication to value "ab";
send the third value "d" to the second party;
receive, from the second party, a fourth value "e", the fourth value being a second semistandard tableau comprising the second value "b" combined with a fifth value "c" selected by the second party; and
create a shared secret by multiplying the first value "a" with the fourth value "e" using Knuth multiplication,
wherein the shared secret matches the third value "d" multiplied by the fifth value "c" using Knuth multiplication.

10. The computing device of claim 9, wherein the first value "a" is generated from an ordered set of symbols agreed to between the first party and the second party.

11. The computing device of claim 10, wherein the first value "a" is generated using a strong entropy source combined with a strong pseudorandom number generator.

12. The computing device of claim 9, wherein the computing device is configured to send the third value using an authentication mechanism.

13. The computing device of claim 9, where the computing device is configured to send the third value using data compression.

14. The computing device of claim 9, wherein the computing device is further configured to:
perform a second key agreement between the first party and the second party, the second key agreement being a key agreement other than a plactic key agreement; and
hash the shared secret with a second shared secret found using the second key agreement.

15. The computing device of claim 14, wherein the second key agreement is any one of Diffie Hellman key agreement; Elliptic Curve Diffie Hellman key agreement;
and Supersingular Isogeny-based Diffie-Hellman (SIDH) key agreement.

16. The computing device of claim 9, wherein the computing device is further configured to use multi-symbol tableaus to create the semistandard tableau.

17. A non-transitory computer readable medium for storing instruction code for key agreement between a first party and a second party over a public communications channel, the instruction code, when executed by a processor of a computing device cause the computing device to:
select a first value "a";
concatenate the first value "a" with a second value "b" to create a value "ab";
create a semistandard tableau for a third value "d" by applying Knuth multiplication to value "ab";
send the third value "d" to the second party;
receive, from the second party, a fourth value "e", the fourth value being a second semistandard tableau comprising the second value "b" combined with a fifth value "c" selected by the second party; and
create a shared secret by multiplying the first value "a" with the fourth value "e" using Knuth multiplication,
wherein the shared secret matches the third value "d" multiplied by the fifth value "c" using Knuth multiplication.

18. The non-transitory computer readable medium of claim 17, wherein the first value "a" is generated from an ordered set of symbols agreed to between the first party and the second party.

19. The non-transitory computer readable medium of claim 18, wherein the first value "a" is generated using a strong entropy source combined with a strong pseudorandom number generator.

20. The non-transitory computer readable medium of claim 17, wherein the computing device is configured to send the third value using an authentication mechanism.

* * * * *